(12) United States Patent
Nishikino et al.

(10) Patent No.: US 6,697,600 B2
(45) Date of Patent: Feb. 24, 2004

(54) COVER PLATE, IMAGE SCANNING DEVICE AND IMAGE FORMING APPARATUS

(75) Inventors: Sachiko Nishikino, Oyama (JP); Takuji Takahashi, Yokohama (JP); Yoshiaki Nagao, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 10/155,090

(22) Filed: May 28, 2002

(65) Prior Publication Data

US 2002/0191996 A1 Dec. 19, 2002

(30) Foreign Application Priority Data

May 25, 2001 (JP) .................................... 2001-157179
Jun. 14, 2001 (JP) .................................... 2001-179750
Apr. 19, 2002 (JP) .................................... 2002-118264

(51) Int. Cl.[7] .............................................. G03G 15/00
(52) U.S. Cl. ..................................................... 399/380
(58) Field of Search ........................... 355/75; 358/474; 382/312, 315; 399/107, 379, 380

(56) References Cited

U.S. PATENT DOCUMENTS

| 1,144,014 A | 6/1915 | Westman |
| 3,685,905 A | 8/1972 | Marshall et al. |
| 4,157,222 A | 6/1979 | Ishihara |
| 5,574,542 A | * 11/1996 | Brook, III .................. 399/380 |
| 5,991,570 A | 11/1999 | Haga et al. |

FOREIGN PATENT DOCUMENTS

| JP | 4-22346 | 5/1992 |
| JP | 6-313930 | 11/1994 |
| JP | 7-95368 | 4/1995 |
| JP | 7-191419 | 7/1995 |
| JP | 8-201935 | 8/1996 |
| JP | 10-153889 | 6/1998 |

* cited by examiner

Primary Examiner—Hoang Ngo
(74) Attorney, Agent, or Firm—Oblon, Spivak, McClelland, Maier & Neustadt, P.C.

(57) ABSTRACT

A cover plate for a document scanning device or an image forming apparatus of the present invention includes a frame connected to the body the image scanning device or that of the image forming apparatus. The frame is openable away from a glass platen and divided in a direction perpendicular to the opening/closing direction. A pressing portion presses the document laid on the glass platen. Mounting/dismounting members allow the pressing portion to be selectively mounted to or dismounted from the frame. An elastic member is included in the pressing portion and includes a sheet member mounted thereon and divided into a plurality of parts and configured to contact the document.

32 Claims, 6 Drawing Sheets

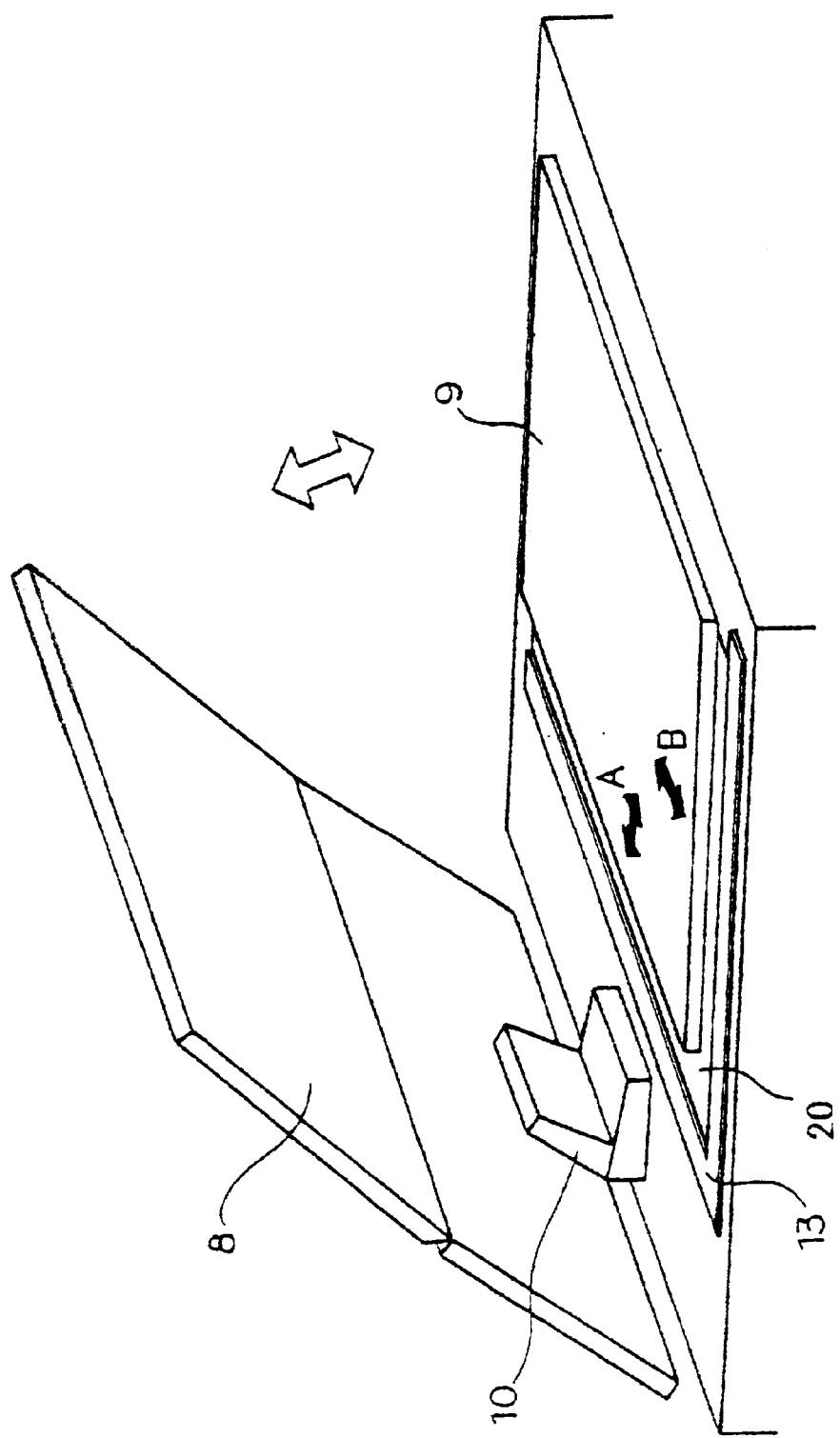

COVER PLATE, IMAGE SCANNING DEVICE AND IMAGE FORMING APPARATUS

BACKGROUND OF THE INVENTION

1. Field of the Invention

The present invention relates to a cover plate mounted on a copier, facsimile apparatus, image scanner or similar image forming apparatus, an image scanning device, and an image forming apparatus.

2. Description of the Background Art

Generally, a cover plate for the above application includes a frame configured to cover a glass platen, a hinge openably connecting the frame to the body of an image scanning device, an elastic member affixed to the frame by, e.g., adhesive tapes, and a pressing portion (including a white sheet) adhered to the surface of the elastic member expected to face the glass platen. The cover plate is so adjusted as to bring the pressing portion into close contact with the glass platen at the time when the hinge is mounted the body.

A problem with the above configuration is that if the hinge is even slightly dislocated relative to the body, then the pressing portion fails to closely contact the glass platen over its entire area and interferes with scales mounted on the edges of the glass platen. As a result, the scales are not fully pressed at the edges of a document laid on the glass platen and cause the document to rise above the glass platen. This not only prevents the scanning device to accurately read the edges of the document, but also allows external light to enter via the resulting gaps. Such portions are printed in black in an output image.

In light of the above, Japanese Patent Laid-Open Publication No. 10-153889, for example, discloses a cover plate including an elastic member formed of, e.g., sponge and a frame to both of which planar fasteners MAGIC TAPE (trade name) available from KURARAY CO., LTD are adhered. The fasteners are positioned at four corners of the elastic member. Only if the elastic member and pressing portion are removed, the cover plate can be easily adjusted such that the pressing portion closely contact a glass platen over its entire area without interfering with scales. Such a cover plate, however, has the following problems left unsolved.

As for a document of relatively small size, for example, the pressing portion and glass platen contact each other over a large area with the result that adhesion to act therebetween during scanning due to static electricity increases. Consequently, the pressing portion and contact glass remain in close contact with each other even when the cover plate is opened after scanning, so that a force is necessary for opening the cover plate. When the cover plate is opened by a force, it lifts the document adhering to the pressing portion. If the document is shifted toward the hinge, then it is likely to be nipped between the cover plate and the body of the image scanning device and damaged thereby. Further, the above adhesion exerts a stress on the interface between the frame and the pressing portion adhered to each other because the planar fasteners are affixed to the sponge portions. The stress is apt to damage the adhered surfaces of the sponge portions.

The glass platen is usually affixed to the body of the image scanning device by, e.g., adhesive tapes. The scales are mounted to the body by screws or similar fastening means such that they are pressed by the glass platen so as to interfere with the edges of the glass platen. Therefore, if the degree of adhesion between the cover plate and the glass platen is high, then the portion of the glass platen adjoining the operator is apt to slightly rise and allows dust to enter via the resulting gap. Moreover, if the above portion of the glass platen noticeably rises, then a heavy impact is apt to act on the glass platen.

To solve the problems described above, Japanese Utility Model Publication No. 07-034425 teaches a step member positioned on a glass platen at a side opposite to a side where a fulcrum for the glass platen is positioned, thereby reducing the degree of adhesion between the glass platen and a cover plate. The step member forms a space between the glass platen and the cover plate for allowing the cover plate to be easily opened.

Japanese Patent Laid-Open Publication No. 7-128932 proposes to use a conductive sheet having a rough surface as a white sheet customarily included in the pressing portion of a cover plate. The conductive sheet protects a book document from bending and damage ascribable to the charging of the pressing portion.

Technologies relating to the image scanning device of the type described are also disclosed in, e.g., Japanese Utility Model Publication No. 4-22346 and Japanese Patent Laid-Open Publication Nos. 6-313930, 7-95368, 7-191419, 8-201935 and 10-153889.

A problem with the step member stated above is that it prevents the sheet from fully contacting the glass platen and makes pressure to act on a document uneven. Further, light entering via the gap between the glass platen and the cover plate, causing the corresponding portion to be printed in black in an output image. On the other hand, the conductive sheet intervenes between a carriage and a device frame and rolled on a take-up roller, making the construction sophisticated and increases the cost.

SUMMARY OF THE INVENTION

It is an object of the present invention to provide a cover plate capable of bringing its pressing portion into close contact with a glass platen over the entire area and reducing a stress to act on the interface between the pressing portion and a frame during opening, an image scanning device, and an image forming apparatus.

It is another object of the present invention to provide a cover plate capable being easily opened while reducing an impact to act on a glass platen, an image scanning device, and an image forming apparatus.

A cover plate for a document scanning device or an image forming apparatus of the present invention includes a frame connected to the body the image scanning device or that of the image forming apparatus. The frame is openable away from a glass platen and divided in a direction perpendicular to the opening/closing direction. A pressing portion presses the document laid on the glass platen. Mounting/dismounting members allow the pressing portion to be selectively mounted to or dismounted from the frame. An elastic member is included in the pressing portion and includes a sheet member mounted thereon and divided into a plurality of parts and configured to contact the document.

An image scanning device and an image forming apparatus each using the above cover plate are also disclosed.

BRIEF DESCRIPTION OF THE DRAWINGS

The above and other objects, features and advantages of the present invention will become more apparent from the following detailed description taken with the accompanying drawings in which:

FIG. 4 is an isometric view demonstrating how a cover plate is mounted to the image scanning device;

DESCRIPTION OF THE PREFERRED EMBODIMENTS

Figure 1:
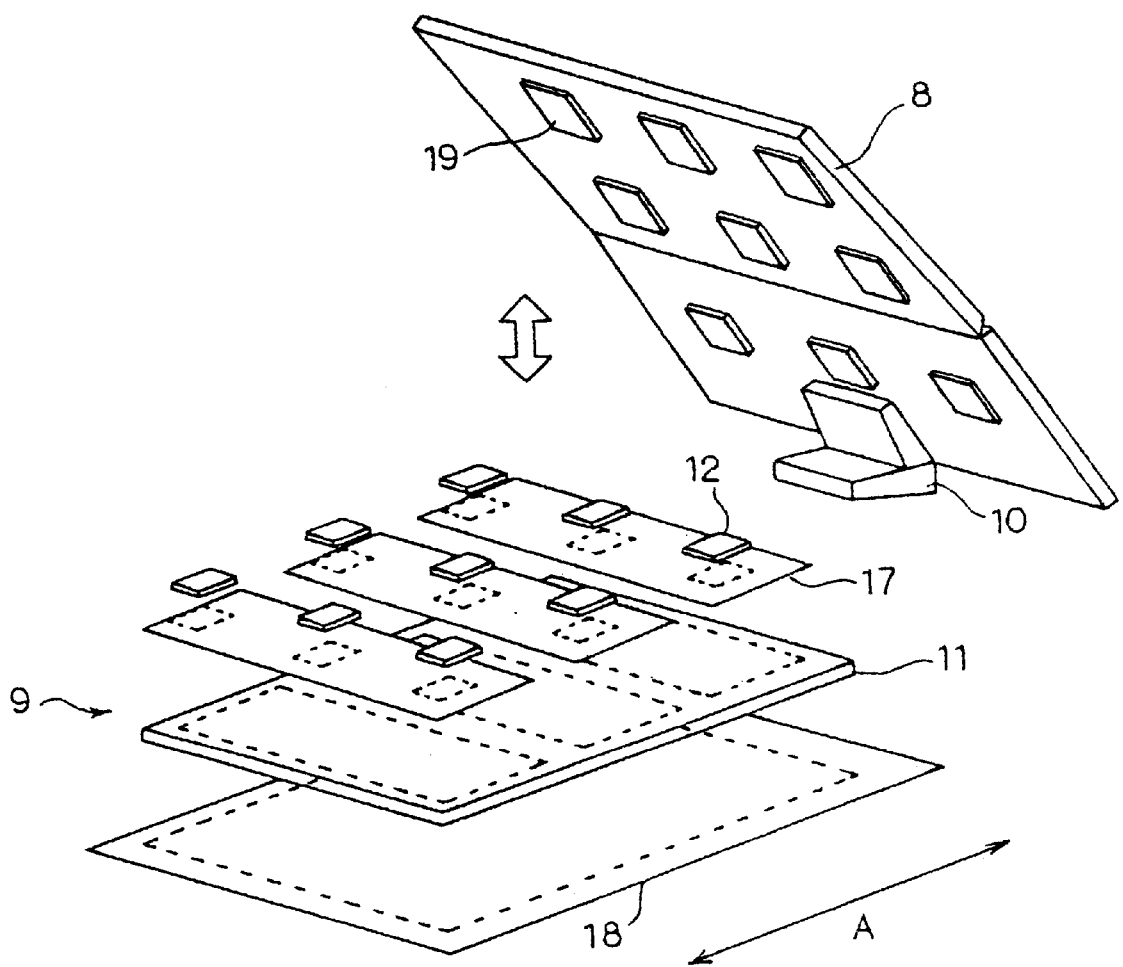
FIG. 1 is an exploded view showing a cover plate embodying the present invention.
Figure 2:
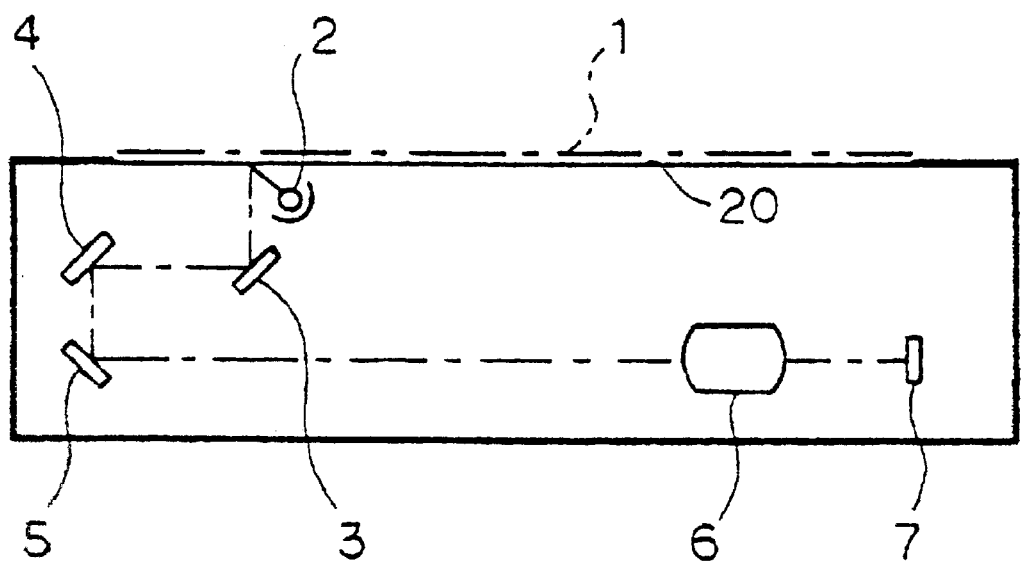
FIG. 2 is a fragmentary, sectional side elevation showing an image scanning device embodying the present invention.

Referring to FIG. 1 of the drawings, an image scanning device embodying the present invention is shown and includes a cover plate. The cover plate includes a pressing portion 9 generally made up of a frame 8, a sheet member 18, an elastic member 11 sandwiched between the frame 8 and the sheet member 18, a plurality of flexible films 17, positioned between the elastic member 11 and the frame 8, and a plurality of planar fasteners (MAGIC TAPE) 12 and 19. As shown in FIG. 2, the sheet member 18 contacts a document 1 laid on a glass platen 20. The flexible films 17 extend perpendicularly to a direction indicated by an arrow A. The planar fasteners 12 and 19 removably fasten the flexible films 17 and frame 8. The fasteners 12 are implemented as loop portions or pile portions while the other fasteners 19 are implemented as hook portions.

As shown in FIG. 2, a lamp 2 illuminates the document 1 laid on the glass platen 20. The resulting imagewise reflection from the document 1 is incident to a CCD (Charge Coupled Device) array 7 via a first mirror 3, a second mirror 4, a third mirror 5, and a lens 6. To scan the document 1 in the subscanning direction, while the lamp 2 and mirror 3 move by a distance of "1" to the right, as viewed in FIG. 2, the mirrors 4 and 5 move by a distance of "½" in the same direction in order to maintain the optical path length of the lens 6 constant. The cover plate is positioned above the glass platen 20 and openable via a hinge or similar connecting member.

Figure 3:
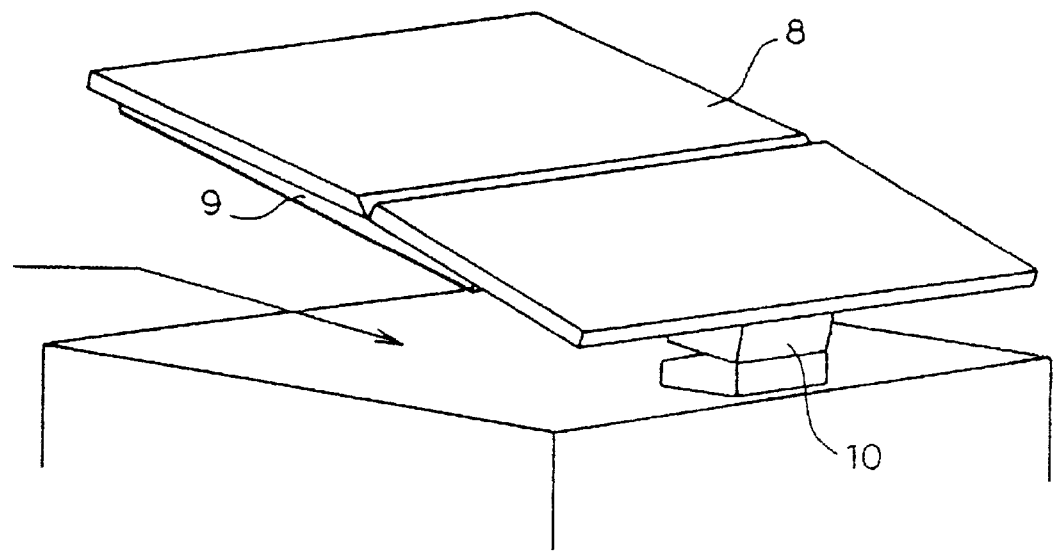
FIG. 3 is a fragmentary isometric view of the image scanning device shown in FIG. 2.

More specifically, as shown in FIG. 3, the pressing portion 9 of the cover plate is removably mounted to the frame 8. A hinge 10 connects the frame 8 and the body of an image forming apparatus, so that the cover plate is openable away from the glass platen 20, i.e., the document 1. By opening the frame 8 away from the glass platen 20, the operator of the apparatus can lay the document 1 on the glass platen 20 or remove it from the glass platen 20. The frame 8 is pressed against the glass platen 20 when closed. The frame 8 and pressing portion 9 may be implemented as a single part or a plurality of parts, as desired. While the frame 8 and pressing member 9 are shown as being bendable, they may not be bendable.

Referring again to FIG. 1, the elastic member 11 has a smaller area than the sheet member 18 by a preselected amount. The loop portions 12 are positioned on the flexible films 17. The sheet member 18 is formed of PET (polyethylene terephthalate) or similar resin and colored in white in order to prevent the edges of the document 1 from being printed in black on a sheet. The elastic member 11 is formed of sponge or similar highly elastic material and connected to the sheet member 18 by, e.g., a two-sided adhesive tape. The elastic films 17 are formed of Mylar or similar material less elastic than the elastic member 11 with respect to the vertical pressure of the frame 8. The elastic films 17 are separate from each other in the direction perpendicular to the direction A in which the frame 8 is openable. The elastic films 17 are connected to the elastic member 11 by two-sided adhesive tapes at a preselected distance from each other.

Assume that the flexible films 17 are implemented as a single film sheet adhered to the entire surface of the elastic member 11. Then, when a force for removing the elastic member 11 from the frame 8 is exerted, as Indicated by arrows in FIGS. 5A and 5B, a force tending to return the single film sheet toward the frame 8 acts in the direction opposite to the above direction, obstructing the removal of the elastic member 11. Further, if the mating force acting between the loop portions 12 and hook portions 19 is greater than the elastic force of the single film sheet, then a force exerted to remove the film sheet causes the film sheet to bend. This prevents the cover plate from evenly pressing the document 1 laid on the glass platen 20.

In the illustrative embodiment, the flexible films 17 are separate from each other in the direction perpendicular to the direction A, as sated earlier. Therefore, the loop portions 12 positioned on the individual films 17 can be easily, sequentially removed from the side opposite to the hinge 10. The loop portions 12 positioned on the films 17 correspond in position to the hook portion 19 positioned on the frame 8. Each hook portion 19 may have the same size as each loop portion 12. Alternatively, one of the hook portion 19 and loop portion 12 may be sized greater than the other in consideration of a possible positional error. The hook portion 19 and loop portion 12 may, of course, be replaced with each other.

The loop portions 12 are evenly distributed with respect to the pressing portion 9 in order to scatter a setting force acting between the frame 8 and the pressing portion 9. Therefore, the pressing portion 9 is prevented from locally coming off even when subjected to a shock ascribable to, e.g., the opening or closing of the frame 8. Further, the pressing member 9 is free from local, intense stresses when removed. In addition, even when the pressing portion 9 is repeated attached and detached for maintenance, it does not damage the elastic member 11 and can be surely attached or detached without any localized adhesive force.

Figure 5A:
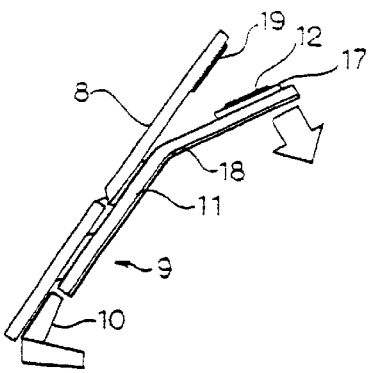
FIGS. 5A through 5C show a procedure for removing a pressing portion included in the cover plate of the illustrative embodiment.
Figure 5B:
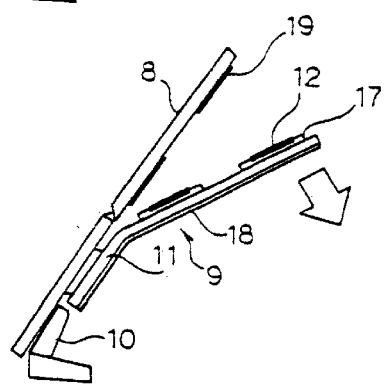
Figure 5C:
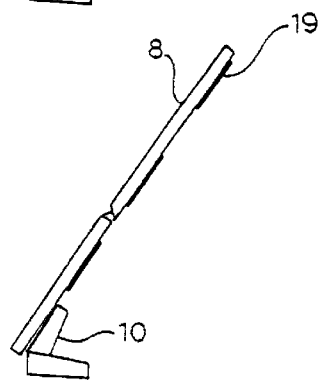

How the frame 8 and pressing portion 9 are mounted to or dismounted from each other will be described with reference to FIGS. 4 and 5. First, a procedure for mounting the pressing portion 9 will be described. As shown in FIG. 4, the operator lays the pressing portion 9 on the glass platen 20 and then moves the pressing portion 9 in directions A and B to thereby position the pressing portion 9 while guaranteeing spaces between it and scales 13. Subsequently, the operator lowers the frame 8 from the position shown in FIG. 4 toward the glass platen 20 while pressing the front portion (right portion in FIG. 4) of the pressing portion 9 with one hand. After the fasteners of the frame 8 (inclusive of the hook portions 19) at the hinge 10 side have mated with the fasteners of the pressing portion 9 (inclusive of the loop portions 12), the operator releases the front portion of the pressing member 9 and then further lowers the frame portion 8 until all the fasteners fully fasten the frame 8 and pressing portion 9 (closed position). Such a procedure brings about a minimum of dislocation of the pressing portion 9, compared to a case wherein the pressing member 9 is directly fastened to the frame 8. Further, the cover plate can be closed without the pressing member 9 interfering with the scales 13 and allows the pressing portion 9 to press the glass platen 20 without any gap between it and the scale 13.

Particularly, because the loop portions 12 are adhered to the elastic member 11 via the flexible films 17, the surfaces of the films 17 can receive the frame 8.

Assume that the loop portions 12 are directly adhered to the elastic member 11 as conventional. Then, when the frame 8 is pressed against the loop portions 12, the individual loop portions 12 are pressed toward the glass platen 20. At this instant, the force of the elastic member 11 tending to return the loop portions 12 toward the frame 8 is too weak to allow the loop portions 12 to surely mate with the hook portions 19. This requires the operator to press the entire frame 8 against the pressing portion 9, then open the cover plate, and then press the pressing portion 9 toward the frame 8 from the sheet 18 side.

A procedure for dismounting the pressing portion 9 from the frame 8 will be described hereinafter. First, as shown in FIG. 5A, the operator opens the cover plate and then pulls down the front end portion of the pressing portion 9 where the top loop portions 12 are positioned, as indicated by an arrow. The pressing portion 9 easily comes off because of the flexible films 17 arranged on the elastic member 11. The sheet member 18 does not bend because the sheet member 18 is elastic enough to withstand the bending of the pressing portion 9.

Subsequently, the successive loop portions 12 following the top loop portions 12 are surely, stably peeled off, so that the pressing portion 9 is surely removed from the pressing portion 9.

It has been customary to directly adhere, e.g., the loop portions 12 to the elastic member 11. In this configuration, when the loop portions 12 are removed, they are apt to leave the elastic member 11 and remain on the hook portions 19 because the elastic force of the elastic member 11 is weaker than the retaining force of the loop portions 12. Further, when the operator opens the cover plate away from the glass platen 20, the pressing portion 9 is pulled toward the glass platen 20 by adhesion acting between the glass platen 20 and the pressing portion, but the frame 8 moves away from the glass platen 20. As a result, a stress acts on the hook portions 19 and also causes the loop portions 12 to come off and remain on the hook portions 19.

By contrast, in the illustrative embodiment, the flexible films 17 prevent the loop portions 12 from coming off the films 17 in the conditions described above. Moreover, because the films 17 are strips extending in the direction perpendicular to the direction A, a tension evenly acts not only on the loop portions 12 but also on the entire films 17, preventing the films 17 from coming off the elastic members 11.

As stated above, in the illustrative embodiment, the pressing portion 9 can evenly contact the glass platen 20. When the cover plate is opened, a minimum of stress acts between the interface between the elastic member 11 and the frame 8 and reduces the impact of the glass platen 20 to thereby facilitate the opening of the cover plate.

Figure 6:
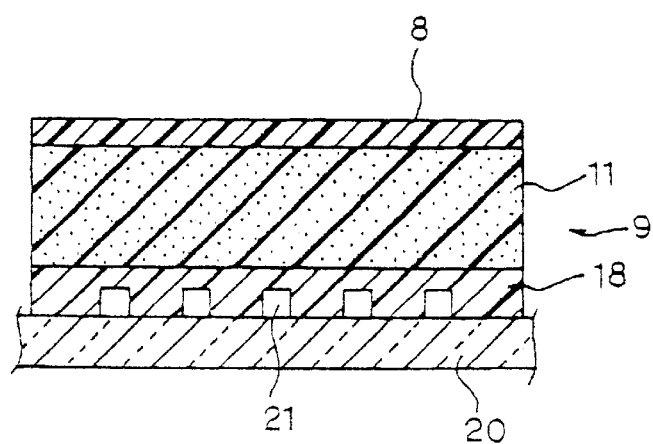
FIG. 6 is a fragmentary, sectional side elevation showing an alternative embodiment of the present invention.

An alternative embodiment of the present invention will be described with reference to FIG. 6. As shown, this embodiment differs from the previous embodiment in that it includes a sheet member 18 having a roughened surface and expected to contact the glass platen 20 or the document 1. The elastic sheet 11 is positioned between the sheet member 18 and the frame 8. The roughened surface of the sheet member 18 forms air gaps 21 between it and the glass platen 20 and allows adhesion between the glass platen 20 and the pressing portion 9 to be suitably reduced, so that the cover platen can be easily opened.

More specifically, the entire surface of the sheet member 18 expected to contact the glass platen 20 is ground to form the air gaps 21. Air entering the air gaps 21 when the cover plate is opened prevents the sheet member 18 from adhering to the glass platen 20. The air gaps 21 would form shadows during scanning if excessively large or would obstruct the entry of air in the air gaps 21 if excessively small. Therefore, the above surface of the sheet member 18 should preferably be ground to such a degree that the air gaps 21 would not form shadows during scanning.

In the above configuration, when the cover plate is opened, the sheet member 18 obviates a force that would cause the pressing portion 9 to adhere to the glass platen 20 and would thereby leave the loop portions 12 on the frame 8. The illustrative therefore allows the cover plate to be easily opened without resorting to the flexible film 17 of the previous embodiment, thereby making the cover plate highly reliable. For example, the loop portions 12 may be directly adhered to the elastic member 11.

The previous embodiment pays attention to the adhesion and elasticity of the pressing portion 9 and frame 8, so that the cover plate can be easily opened away from the glass platen 20. The flexible film 17 of the previous embodiment may be applied to the illustrative embodiment also so as to cause the document 1 to surely contact the glass platen 20 during scanning.

Usually, part of the glass platen 20 corresponding to the end portion of the frame 8 opposite to the hinge 10 does not lie in a scanning range. Therefore, part of the sheet member 18 corresponding to such part of the glass platen 20 may be roughened more than the other part of the sheet member 18, which lies in the scanning range. This reduces a load to act at the beginning of opening of the cover plate for thereby further facilitating the opening of the cover plate.

Figure 7A:
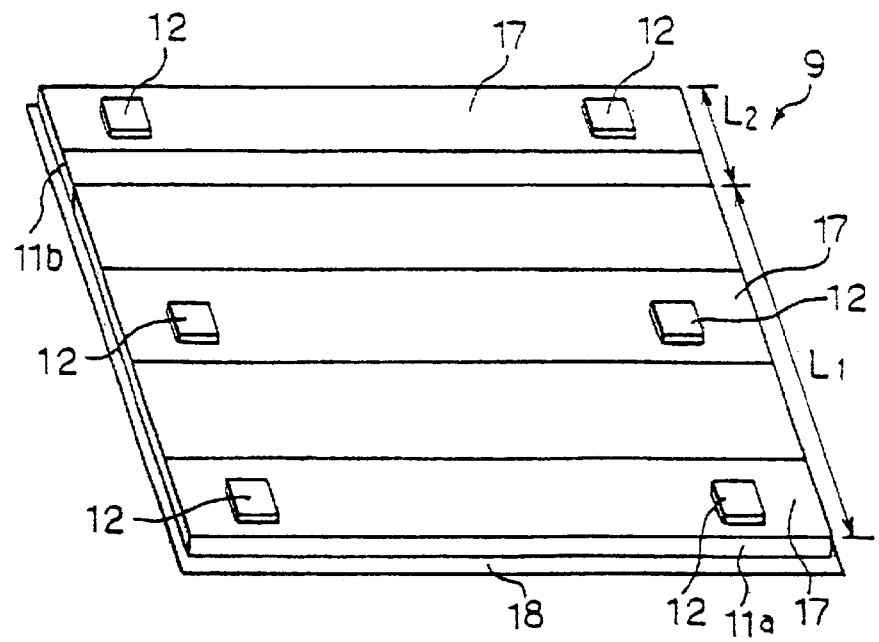
FIG. 7 is a fragmentary isometric view showing still another alternative embodiment of the present invention.
Figure 7B:
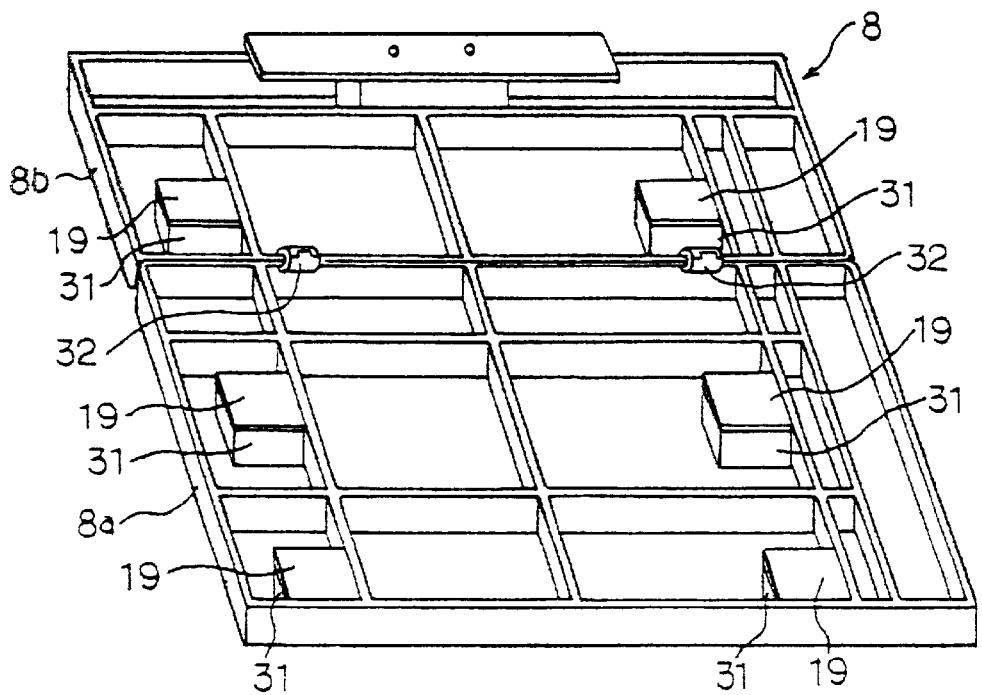

Reference will be made to FIGS. 7A and 7B for describing another alternative embodiment of the present invention. As shown, this embodiment differs from the embodiment described first in that it includes divided, elastic members 11a and 11b positioned on the pressing portion 9. The sheet member 18 expected to contact the glass platen 20 is attached to the elastic members 11a and 11b. The sheet members 11a and 11b follow the thickness and configuration of the document being pressed by the sheet member 18. The sheet can therefore be evenly, closely pressed against the glass platen 20.

Figure 8:
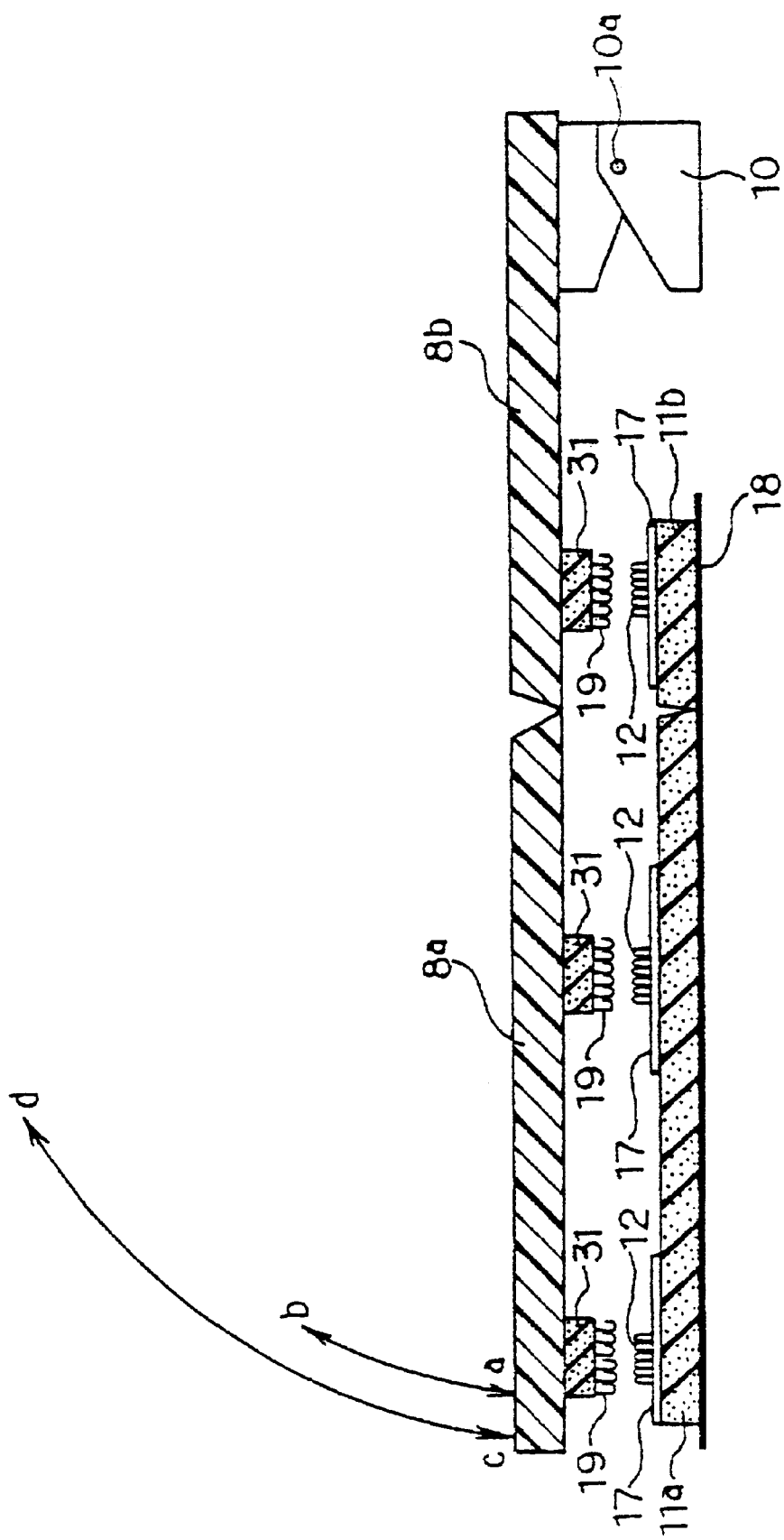
FIG. 8 is a fragmentary, sectional side elevation showing the embodiment of FIGS. 7A and 7B.

As shown in FIG. 8 as well as in FIGS. 7A and 7B, the pressing portion 9 for pressing the document is removably mounted to the frame 8 as in the embodiment described first. The cover plate is mounted to the apparatus body via the hinge 10 in such a manner as to be openable away from the glass platen 20. The frame 8 is made up of a first frame portion 8a and a second frame portion 8b hinged or otherwise connected to each other. The first frame portion 8a is angularly movable about fulcrums 32 relative to the second frame portion 8b in directions a and b. By opening the frame 8 away from the glass platen, the operator of the apparatus can lay the document on the glass platen or remove it from the glass platen.

The fulcrums 32 about which the first frame portion 8a is movable are positioned closer to the fulcrum of the hinge 10

(connected end) than to the intermediate between the opening end of the frame 8 (left end in FIG. 8). In this configuration, when a document cut and pasted or a book document is pressed against the glass platen, the second frame portion 8b bends and makes the pressure acting on the document lower at the fulcrum side than at the opening end side. The cover plate can therefore evenly press such a document in accordance with the configuration of the document.

Ribs for reinforcement are formed on the bottom of the frame 8 that faces the glass platen when the cover plate presses the document. Cubic elastic members 31 formed of, e.g., sponge are adhered to the bottom of the frame 8 in such a manner as to face the loop portions 12 of the pressing portion 9. At least one face of each elastic member 31 contacts one of the ribs. The hook portions 19 each are adhered to the face of one elastic member 31 that faces one loop portion 12. The hook portion 19 is equal in area to the above face of the elastic member, but greater in area than the loop portion 12 by a preselected amount. The hook portions 19 are attached to the frame 8 because the hook portions 19 are more durable than the loop portions 12 and because the hook portions 19 are replaced at the time of maintenance. The area of the hook portions 19 greater than the area of the loop portions 12 is successful to absorb irregularity in parts. The thickness of each elastic member 31 is selected such that when the hook portion 19 is adhered to the member 31, the hook protrudes above the top of the rib adjoining it. This prevents contact pressure to act when the hook portions 19 and loop portions 12 contact from becoming excessively high.

The sheet member 18 is formed of PET or similar resin and colored white in order to prevent the edges of the document from being printed in black on a sheet. The elastic members 11a and 11b each have a smaller area than the sheet member 18 by a preselected amount and is adhered to the sheet member 18. More specifically, the elastic members 11a and 11b are formed of sponge or similar highly elastic material and adhered to the sheet member 18 by two-sided adhesive tapes. The position where the elastic members 11a and 11b are divided corresponds to the fulcrums 32 about which the frame 8a is movable, so that the elastic members 11a and 11b follow the bending movement of the frame portions 8a and 8b (directions a and b, FIG. 8). Assume that the distance between the fulcrum 10a of the frame 8 and the position where the frame 8b is bendable is L2, and that the distance between the above position of the frame 8b and the opening end of the frame 8 is L1. Then, in the illustrative embodiment, the distance or length L1 is selected to be greater than the distance or length L2.

In the above configuration, assume that while the pressing portion 9 mounted to the frame 8 is resting on a document, the operator lifts the frame 8a in the direction b in order to shift the document. Then, air enters the gap between the glass platen 20 and the sheet member 18 little by little from the opening end side of the frame 8. As a result, adhesion acting between the glass platen 20 and the pressing portion 9 is adequately reduced, facilitating the shift of the document.

Flexible strips 17 implemented by film sheets are adhered to the other surfaces of the elastic members 11a and 11b not adhered to the sheet member 18, i.e., facing the frame 8. Each strip 17 has an area smaller than the area of the elastic member 11a or 11b by a preselected amount. The strips 17 extend perpendicularly to the direction in which the frame 8 is openable although they may extend in parallel to the above direction. The strips 17 may even be so arranged as to adjoin each other in both of the directions perpendicular to and parallel to the opening direction of the frame 8. The strips 17 are formed of Mylar or similar material such that their elastic force is weaker than the elastic force of the elastic members 11a and 11b in the direction perpendicular to the surface of the frame 8. The strips 17 are adhered to the elastic members 11a and 11b by two-sided adhesive tapes or adhesive at preselected intervals.

The loop portions 12 are adhered to the strips 17, and each is smaller in area than each strip 17 by a preselected amount and smaller in area than each hook portion 19 by a preselected amount. The loop portions 12 so supported by the strips 17 are protected from peeling or damage when removed from the hook portions 19. If the loop portions 12 are directly adhered to the elastic member 11 softer than the elastic strips 17, then it is likely that the elastic member 11 is damaged when the loop portions 12 are removed from the hook portions 19.

In the illustrative embodiment, the loop portions 12 that easily wear and deteriorate are attached to the pressing portion 9, which is replaced more frequently than the frame 8. This, coupled with the fact that the loop portions 12 are smaller in area than the hook portions 19, reduces maintenance cost. The loop portions 12 on each strip 17 are positioned closer to the center of the strip 17 than the four corners of the same. This prevents, when the cover plate is opened in the direction d, FIG. 8, or when the frame 8a is opened in the direction b, FIG. 8, the four sides or the elastic member 11, i.e., the edges of the strips 17 from being pulled away from the member 11 by adhesion acting between the glass platen 20 and the pressing portion 9. Further, the loop portions 12 are positioned closer to the center of the elastic member 11 than the four corners of the same in order to obviate local, heavy stresses ascribable to the opening and closing of the cover plate. Also, such positions of the loop portions 12 protect the elastic member 11 from damage when the pressing portion is dismounted from the frame 8 for maintenance, while insuring mounting and dismounting free from localized adhesion.

The pressing portion 9 is mounted to or dismounted from the frame 8 in substantially the same manner as in the embodiment described first. Specifically, to mount the pressing portion 9 to the frame 8, the operator lays the pressing portion 9 on the glass platen 20 and positions the pressing portion 9 while guaranteeing spaces between it and scales 13. Subsequently, the operator lowers the frame 8. After the hook portions 19 have mated with the loop portions 12, the operator further lowers the frame 8a until the frame 8 and pressing portion 9 fully contact each other (closed position). Such a procedure allows the cover plate to be closed without the pressing member 9 interfering with the scales 13 and allows the edges of the scales 13 and pressing portion 9 to contact each other without any gap.

To dismount the pressing portion 9 from the frame 8, the operator opens the cover plate and then sequentially removes the loop portions 12 from the hook portions 19 from the top to the bottom. At this instant, the loop portions 12 easily separate from the hook portions 19 because the flexible strips 17 are positioned on the separate elastic members 11a and 11b. Also, the sheet member 18 does not bend because it is elastic enough to withstand the bending of the pressing portion 9. Further, the flexible strips 17 prevent the loop portions 12 from coming off the pressing portion 9 and dropping. Moreover, tension evenly acts on the entire strips 17 when the pressing portion 9 is dismounted, because the strips 17 extend vertically to the opening and closing direction of the frame 8. This prevents the strips 17 from coming off the elastic member 11. In addition, the loop portions 17 adhered to the strips 17 are pressed against the hook portions 19, which protrude above the ribs of the frame 8, so that the pressing portion 9 has the same height.

Again, the frame 8 and pressing portion 9 may be implemented as a single part or a plurality of parts, as desired. While the frame 8 and pressing member 9 are shown as being bendable, they may not be bendable.

Assume that the elastic member 11a has hardness $H_2$ while the elastic member 11b has hardness $H_1$. Then, the hardness H1 may be selected to be greater than the hardness H2 in order to achieve the same advantages as achievable with the previously stated relation of L1>L2. While any suitable hardness tester may be used to determine such hardness, the illustrative embodiment uses a spring type hardness tester prescribed by SRIS 0101 standards of The Society of Rubber Industry, Japan.

While the illustrative embodiments shown and described have concentrated on an image scanning device, the present invention is similarly applicable to a conventional image forming apparatus of the type including a photoconductive drum, a charger, a writing unit, a developing unit, an image transfer charger, and a separation charger.

It is to be noted that the flexible member includes the flexible strips 17 or the sheet member 18 while the mounting/dismounting means includes the planar fasteners (loop portions 12 and hook portions 19).

In summary, it will be seen that the present invention provides a cover plate capable of evenly pressing a document against a glass platen. This is also true when the document is a document cut and pasted or a book document. Further, the cover plate is easy to open away from the glass platen and reduces maintenance cost.

Various modifications will become possible for those skilled in the art after receiving the teachings of the present disclosure without departing from the scope thereof.

What is claimed is:

1. A cover plate for pressing a document against a glass platen, said cover plate comprising:
   a frame adapted to be connected to a body of an image forming apparatus to be openable away from the glass platen and divided in a direction perpendicular to an opening/closing direction;
   a pressing portion for pressing the document laid on the glass platen;
   mounting/dismounting means for allowing said pressing portion to be selectively mounted to and dismounted from said frame; and
   an elastic member included in said pressing portion and having a sheet member mounted thereon, said sheet member being divided into a plurality of parts and configured to contact the document.

2. The cover plate as claimed in claim 1, wherein said elastic member is divided at a position corresponding to a position where said frame is divided.

3. The cover plate as claimed in claim 2, wherein said elastic member is divided in a direction perpendicular to the opening/closing direction of said frame.

4. The cover plate as claimed in claim 2, wherein a distance between an end of said frame adapted to be connected to the body and the position where said frame is divided is smaller than a distance between said position and an opening/closing end of said frame.

5. The cover plate as claimed in claim 2, wherein a part of said frame between an end of said frame adapted to be connected to the body and the position where said frame is divided has a hardness lower than a part between said position and an opening/closing end of said frame.

6. The cover plate as claimed in claim 2, wherein a surface of said sheet member adapted to contact the glass platen is roughened.

7. The cover plate as claimed in claim 6, wherein surface roughness of said sheet member differs between a portion adjoining an end of said frame adapted to be connected to the body and a portion adjoining an opening/closing end of said frame.

8. A cover plate for pressing a document against a glass platen, said cover plate comprising:
   a frame adapted to be connected to a body of an image forming apparatus to be openable away from the glass platen and divided in a direction perpendicular to an opening/closing direction;
   a pressing portion for pressing the document laid on the glass platen; and
   a plurality of mounting/dismounting means for allowing said pressing portion to be selectively mounted to and dismounted from said frame;
   wherein said pressing portion comprises a sheet member configured to contact the document, an elastic member intervening between said sheet member and said frame, and a plurality of flexible members intervening between said elastic member and said frame; and
   said plurality of mounting/dismounting means each are attached to a respective flexible member.

9. The cover plate as claimed in claim 8, wherein said flexible member is divided at a position corresponding to a position where said frame is divided.

10. The cover plate as claimed in claim 9, wherein said flexible member is divided in a direction perpendicular to the opening/closing direction of said frame.

11. The cover plate as claimed in claim 8, wherein a surface of said sheet member adapted to contact the glass platen is roughened.

12. The cover plate as claimed in claim 11, wherein surface roughness of said sheet member differs between a portion adjoining a side where said frame adapted to be connected to the body and a portion adjoining an opening/closing end of said frame.

13. A cover plate for pressing a document against a glass platen, said cover plate comprising:
   a frame adapted to be connected to a body of an image forming apparatus to be openable away from the glass platen and divided in a direction perpendicular to an opening/closing direction;
   a pressing portion including a plurality of elastic members adapted to press the document laid on the glass platen; and
   a plurality of mounting/dismounting means for allowing said pressing portion to be selectively mounted to and dismounted from said frame, said plurality of mounting/dismounting means being arranged at at least six positions on said pressing portion other than four corners.

14. The cover plate as claimed in claim 13, wherein said mounting/dismounting means are arranged at a center portion other than the four corners.

15. The cover plate as claimed in claim 13, wherein said mounting/dismounting means comprises planar fasteners made up of hook portion adhered to said frame and loop portions adhered to said pressing portion, and each of said hook portions and each of said loop portions have a same area as each other.

16. A cover plate for pressing a document against a glass platen, said cover plate comprising:
   a frame adapted to be connected to a body of an image forming apparatus to be openable away from the glass platen and divided in a direction perpendicular to an opening/closing direction;
   a pressing portion adapted to press the document laid on the glass platen; and
   a plurality of mounting/dismounting means for allowing said pressing portion to be selectively mounted to and dismounted from said frame, said plurality of mounting/dismounting means being arranged at at least six positions on said pressing portion other than four corners;
   wherein said mounting/dismounting means comprise planar fasteners made up of hook portion adhered to said frame and loop portions adhered to said pressing portion, and
   each of said hook portions and each of said loop portions have a same area as each other; and
   wherein said pressing portion comprises:
      a sheet member configured to contact the document;
      a plurality of elastic members intervening between said sheet member and said frame and divided in a direction perpendicular to the opening/closing direction of said frame at a position corresponding to a position where said frame is divided; and
      a plurality of flexible members intervening between said plurality of elastic members and said frame and divided in the direction perpendicular to the opening/closing direction of said frame at the position where said frame is divided, said loop portions each being attached to a respective flexible member.

17. The cover plate as claimed in claim 16, wherein said loop portions each have a smaller area than each of said flexible members, and said loop portions are arranged at a center portion other than four corners of the flexible member.

18. The cover plate as claimed in claim 15, wherein a plurality of elastic members each having a respective hook portion thereon are mounted on a bottom of said frame facing said pressing portion.

19. The cover plate as claimed in claim 18, wherein said elastic members have such a height that said hook portions protrude above ends of ribs, which are mounted on said frame.

20. The cover plate as claimed in claim 15, wherein a surface of said sheet member adapted to contact the glass platen is roughened.

21. A cover plate for pressing a document against a glass platen, said cover plate comprising:
   a frame adapted to be connected to a body of an image forming apparatus to be openable away from the glass platen and divided in a direction perpendicular to an opening/closing direction;
   a pressing portion adapted to press the document laid on the glass platen; and
   a plurality of mounting/dismounting means for allowing said pressing portion to be selectively mounted to and dismounted from said frame, said plurality of mounting/dismounting means being arranged at at least six positions on said pressing portion other than four corners;
   wherein said mounting/dismounting means comprise planar fasteners made up of hook portion adhered to said frame and loop portions adhered to said pressing portion, and each of said hook portions and each of said loop portions have a same area as each other;
   wherein a surface of said sheet member adapted to contact the glass platen is roughened; and
   wherein surface roughness of said sheet member differs between a portion adjoining an end of said frame adapted to be connected to the body and an opening/closing end of said frame.

22. In an image scanning device including a cover plate, said cover plate comprising;
   a frame adapted to be connected to a body of said image scanning device to be openable away from the glass platen and divided in a direction perpendicular to an opening/closing direction;
   a pressing portion for pressing the document laid on the glass platen;
   mounting/dismounting means for allowing said pressing portion to be selectively mounted to and dismounted from said frame; and
   an elastic member included in said pressing portion and having a sheet member mounted thereon, said sheet member being divided into a plurality of parts and configured to contact the document.

23. In an image forming apparatus including a cover plate, said cover plate comprising:
   a frame adapted to be connected to a body of said image forming apparatus to be openable away from the glass platen and divided in a direction perpendicular to an opening/closing direction;
   a pressing portion for pressing the document laid on the glass platen; mounting/dismounting means for allowing said pressing portion to be selectively mounted to and dismounted from said frame; and
   an elastic member included in said pressing portion and having a sheet member mounted thereon, said sheet member being divided into a plurality of parts and configured to contact the document.

24. An image scanning device comprising:
   reading means comprising a light-sensitive device array extending in a main scanning direction;
   a light source for illuminating a document;
   optical means for focusing a reflection from the document on said reading means;
   drive means for causing the document and said reading means to move relative to each other in a subscanning direction; and
   document pressing means openable away from a casing and comprising a hinge, a frame, a pressing portion including a plurality of elastic members adapted to press the document, and mounting/dismounting means for allowing said pressing portion to be selectively mounted to and dismounted from said frame;
   wherein said mounting/dismounting means comprise planar fasteners made up of hook portion mounted on hook support members and loop portions mounted on loop support members.

25. The device as claimed in claim 24, wherein said hook support members and said loop support members are mounted on said frame and said pressing portion, respectively.

26. The device as claim in claim 24, wherein said hook support members are mounted on said frame via an elastic member.

27. The device as claimed in claim 24, wherein said hook support members and said loop support members each have a particular area.

28. A cover plate configured to press a document against a glass platen of an image forming apparatus, comprising:
   a frame;
   a pressing portion comprising a plurality of sheet members adapted to contact the document; and
   at least one fastener removably attaching the pressing portion with the frame.

29. A cover plate configured to press a document against a glass platen of an image forming apparatus, comprising:
   a frame;
   a pressing portion comprising a sheet members adapted to contact the document, a plurality of flexible members, and an elastic member disposed between the sheet member and the plurality of flexible members; and
   at least one fastener connected to the plurality of flexible members to removably attach the pressing portion with the frame.

30. A cover plate configured to press a document against a glass platen of an image forming apparatus, comprising:
   a frame;
   a pressing portion comprising a plurality of sheet members adapted to contact the document; and
   a plurality of fasteners removably attaching the pressing portion with the frame, the plurality of fasteners comprising six fasteners arranged at six positions on the pressing portion other than corners of the pressing portion.

31. An image scanning device comprising:
   a glass platen; and
   a cover plate configured to press a document against the glass platen, the cover plate comprising:
      a frame;
      a pressing portion comprising a plurality of elastic members adapted to contact the document; and
      fasteners removably attaching the pressing portion with the frame.

32. An image scanning device comprising:
   a glass platen;
   means for reading an image on a document disposed on the glass platen; and
   means for pressing the document against the glass platen, the means for pressing comprising
      a frame;
      a pressing portion comprising a plurality of elastic members adapted to contact the document; and
      at least one fastener removably attaching the pressing portion with the frame, wherein the at least one fastener comprises one of a hook portion and a loop portion.

\* \* \* \* \*